June 8, 1965     C. H. PERKINS ETAL     3,187,582
TRANSPARENT INSTRUMENT CASE CLOSURE
Filed Nov. 16, 1961
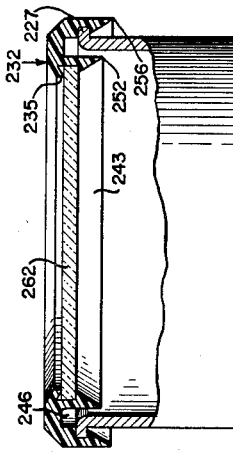
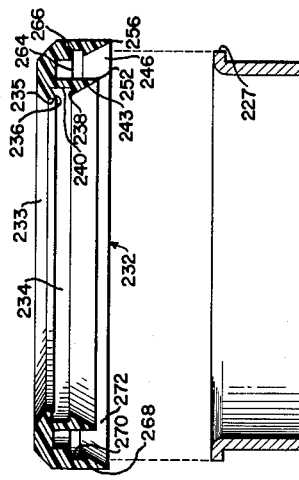
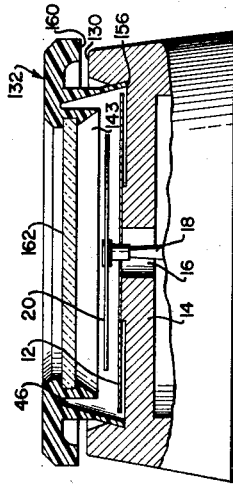
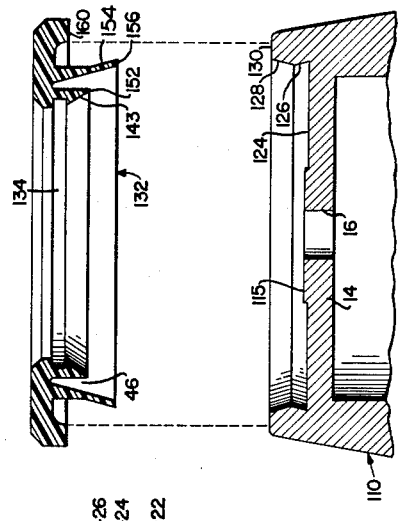
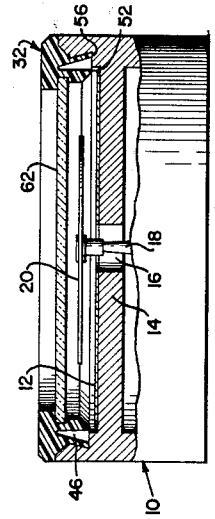
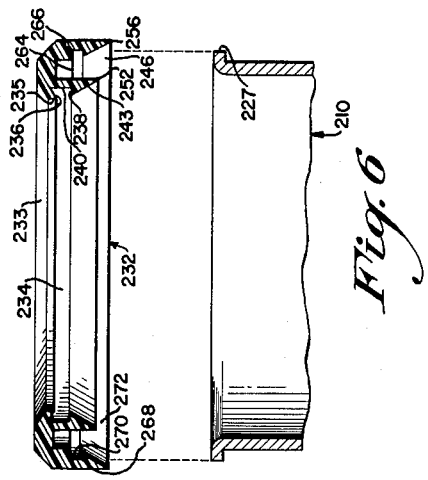
INVENTORS
Charles H. Perkins &
Edward N. Caldwell.
BY A. A. O'Brien
ATTORNEY 3,187,582
TRANSPARENT INSTRUMENT CASE CLOSURE
Charles H. Perkins and Edward N. Caldwell, both of Knoxville, Tenn., assignors to Robertshaw Controls Company, Richmond, Va., a corporation of Delaware
Filed Nov. 16, 1961, Ser. No. 152,728
8 Claims. (Cl. 73—431)

The present invention relates to instrument gauge cases and more particularly to a closure for mounting a viewing lens on an instrument case.

In mounting viewing lenses on instrument cases it is necessary that the seal between the lens and the case be effective to maintain the interior of the case properly protected to insure that the case is dustproof and weatherproof. In providing such a seal, it is also desirable to provide ease of access to the interior of the case for servicing and/or recalibrating the mechanism contained therein. Therefore, the means provided for attaching a lens to an instrument case must insure proper protection for the interior of the case, and at the same time the attachment should not require that a vigorous procedure be necessary to gain access to the interior of the case. It would also be desirable if removal and replacement of lenses could be accomplished without the necessity of replacing other parts, such as gaskets, washers and the like, whose sealing characteristics may be destroyed.

It is, therefore, an object of this invention to overcome the foregoing difficulties by constructing an instrument case which permits removal and replacement of a transparent lens with ease while maintaining an effectual seal, without requiring the use of gaskets, washers or similar auxiliary sealing devices.

It is another object of the present invention to provide selectively detachable transparent closure means for an instrument case.

It is a further object of the invention to provide a transparent closure for an instrument case which may be installed and removed as a single unit, and which eliminates clips, gaskets, and threading of cases and components to be attached thereto.

It is a further object of the invention to provide a transparent closure means for an instrument case which may be easily removed and replaced without having its sealing characteristics impaired thereby.

It is a further object of the invention to provide a transparent closure for an instrument case which may be snapped into and out of sealing position.

It is a further object of the present invention to provide a transparent closure for an instrument case which permits ease of access to the interior of the case for servicing or recalibrating of mechanisms therein.

It is a further object of the present invention to provide a transparent closure for an instrument case which insures that the case is properly sealed to be dustproof and weatherproof, and which will exclude corrosive fumes or vapors from the case interior without itself corroding or sticking.

In carrying out this invention, an annular ring of resilient material is provided with an inner groove that retains a viewing lens and with a series of outer surfaces that conform to the surfaces on an instrument case whereby the lens and ring may be sealingly mounted as unit on the instrument case.

Additional features and advantages of the invention will become apparent from the following description in connection with the accompanying drawings wherein:

FIG. 1 is an elevation view with parts in section of an instrument case embodying the invention;

FIG. 2 is a partial exploded view of the parts shown in section in FIG. 1;

FIG. 3 is an elevation view with parts in section showing a modification of FIG. 1;

FIG. 4 is a partial exploded view of the parts shown in section in FIG. 3;

FIG. 5 is an elevation view with parts in section showing another modification of FIG. 1; and FIG. 6 is a partial exploded view of the parts shown in section in FIG. 5.

As is illustrated in FIG. 1, an instrument case, indicated generally at 10, may be made of any suitable material and is of the type used for pressure indicating gauges and temperature indicating gauges. An indicating dial 12 containing suitable indicia for the desired gauge reading is fixed to a partition wall 14 which is made integral with the case 10. A central opening 16 in the partition wall 14 receives a shaft 18 adapted to rotate in response to pressure actuated means (not shown). The free end of the shaft 18 carries an indicating pointer or needle 20 for cooperation with the indicia on the dial 12.

The viewing end of case 10 is formed with an opening defined by a series of stepped and slanted walls adjacent the open end of case 10 as shown in FIG. 2. The internal wall of case 10 has a cylindrical step 22 leading vertically from the upper periphery of partition 14 and terminating at a horizontal ledge 24 which forms an annular shoulder. Extending upwardly from the annular shoulder 24, the internal wall of case 10 is formed with a pair of annular surfaces slanted in opposite directions from the vertical at acute angles. The first surface 26 tapers upwardly and inwardly from the outer periphery of annular shoulder 24 so that surface 26 presents an annular surface of decreasing diameter. The second surface 28 extends upwardly and outwardly from the circumference defining the upper edge of surface 26 so that surface 28 presents an annular surface of increasing diameter. The surface 28 terminates at its juncture with a flat horizontal surface 30 which is the uppermost end portion of the case 10.

The various surfaces forming the open end of the case 10 receive a unitary assembly which serves both as a closure sealing means and a lens housing. As is illustrated in FIG. 2, this unitary assembly includes a ring, indicated generally at 32, machined or moulded from any suitable resilient material, such as polypropylene. The inner periphery of the ring 32 is provided with a lens receiving annular groove 34 having a generally rectangular cross section defined by upper and lower flat surfaces 36 and 38 joined by a flat cylindrical surface 40. The upper surface 36 of the groove 34 has a larger circular area than the lower surface 38 for a purpose to be described hereinafter. Below the groove 34 the inner periphery of the ring 32 has a flat cylindrical surface 42 from which a slanted surface 44 extends downwardly and outwardly.

The bottom side of ring 32 is provided with an annular groove 46 defined by a flat cylindrical surface 48 and a slanted surface 50. As viewed in FIG. 2, the bottom of ring 32 has an inner flexible lip 52 formed by the surface 48 on one side and by the surfaces 42 and 44 on the other side. The outer periphery of ring 32 has a sloping surface 54 extending in the same direction as surface 50 and cooperating therewith to form an outer flexible lip 56. The surface 54 has a slope conforming to the slope of the surface 26 in the case 10 and is joined by an oppositely sloping surface 58 which has a slope conforming to the slope of the surface 28 in the case 10. The surface 58 terminates at its juncture with a flat horizontal surface 60 which conforms to the shape of the horizontal surface 30 on the uppermost end of the case 10.

A transparent closure or viewing lens 62 has a peripheral edge with the same configuration of the annular groove 34 so as to form a close fit therewith when the lens 62 is mounted in the ring 32. It is to be noted that the upper flat surface 36 of the groove 34 engages a substantial area of the outer face of the lens 62 to prevent removal thereof in an upward direction as viewed in FIG. 1. The lens 62 is assembled in the ring 32 by being forced upwardy against the sloping surface 44 causing the inner flexible lip 52 to flex radially outwardly. As soon as the lens 62 is moved past the inner surface 42 of the ring 32 and into the annular groove 34, the flexible lip 52 snaps back to its original position; then the surface 38 defining the lower part of groove 34 engages the peripheral portion of the inner face of the lens 62. With such an arrangement, the two surfaces 36 and 38 resiliently clamp the lens 62 adjacent its periphery and thus retain the lens 62 in assembled relationship with the sealing ring 32.

The unitary assembly of the sealing ring 32 and lens 62 is assembled on the case 10 by forcing the ring 32 downwardly against the sloping surface 28 causing the outer flexible lip 56 to flex radially inwardly. As soon as the outer surface 54 of the flexible lip 56 is moved past the entire surface 28, the flexible lip 56 snaps back to its original position; then the peripheral surfaces 54, 58 and 60 of the sealing ring 32 engage the surfaces 26, 28 and 30, respectively, of the case 10. Thus, a dust and vapor tight seal is effected between the sealing ring 32 and the lens 62 and the case 10. It is apparent that the unitary assembly of the lens 62 and the ring 32 may be snapped into and out of sealing engagement with case 10 without the use of any tools and without the need for bolts, clamps, or any other fasteners. If it is desired to gain access to the interior of the case 10, the unitary assembly of the lens 62 and the ring 32 may be removed by merely exerting an outward force on the assembly whereupon the outer flexible lip 56 will flex radially inwardly. While it is contemplated that the lens 62 be retained in the ring 32 in such a way as to prevent removal, the construction is such that, in the event of accidental breakage, a new lens may be easily installed.

While the lens 62 is described as a flat circular lens and the case 10 is described as having a circular configuration, it is to be understood that other types of lenses, such as convex, and other shapes of cases, such as rectangular, could be utilized in the present invention by designing the ring 32 to a conforming shape.

In the modification shown in FIGS. 3 and 4, the same reference numerals used in FIGS. 1 and 2 are used for identical parts and reference numerals with 100 added are used for similar parts. Accordingly, only the parts which are different from those of FIGS. 1 and 2 will be described in detail.

As is illustrated in FIG. 4, the partition wall 14 has a centrally disposed boss 115 on which the indicating dial 12 is suitably fastened. The opening in case 110 is defined by a pair of annular surfaces slanted in opposite directions from the vertical at acute angles. The first surface 126 tapers upwardly and inwardly from the outer periphery of annular base portion 124 so that surface 126 presents an annular surface of decreasing diameter. The first surface 126 and the second surface 128 are similar to surfaces 26 and 28, respectively, in FIG. 2.

Closure means for the opening in case 110 includes a ring 132, the inner periphery of which has an annular groove 134 for receiving a viewing lens 162 which is similar to the lens 62 of FIG. 1. Below the groove 134, the inner periphery of ring 132 has a slanted surface 143 extending downwardly and outwardly in a conical configuration. As shown in FIG. 4, the inner flexible lip 152 and the outer flexible lip 156 terminate in different planes. The outer flexible lip 156 has an outer slanted surface 154 conforming to slope of surface 126 and cooperating therewith when the unitary assembly of the ring 132 and lens 162 is snapped into a mounting position in the case 110. When the ring 132 is mounted on the case 110, there is a slight gap between the top annular surface 130 of case 110 and the flat undersurface 160 of the ring 132. This gap facilitates the removal of ring 132 from the case 110 by exterting an upward force on the undersurface 160.

The assembly operation of the lens 162 in the ring 132 and of the unitary lens and ring assembly in the case 110 is performed in the same manner as that described with regard to FIGS. 1 and 2.

In the following description of the modification shown in FIGS. 5 and 6, the same reference numerals used in FIGS. 1 and 2 are used for identical parts and reference numerals with 200 added are used for similar parts. Accordingly, only the parts which are different from those of FIGS. 1 and 2 will be described in detail.

An instrument case, indicated generally at 210, is made of sheet metal material in cylindrical form having its open end defined by an outwardly extending circumferential flange 227.

Closure means for the opening in the case 210 includes a ring 232, the inner periphery of which has a lens receiving annular groove 234. The groove 234 has an upper surface 236 sloping upwardly and a lower flat horizontal surface 238 joined by a flat cylindrical surface 240. Adjacent its top portion the ring 232 has an inwardly sloping surface or chamfer 233 having the same slope as the undersurface 236 and forms a flexible lip 235 therebetween. With such an arrangement, the same groove 234 will accommodate various lenses of different thicknesses. Thus, if lens 262 should be broken, it would not be necessary that the replacement lens be the same thickness. A lens is assembled in the ring 232 by forcing the same upwardly against the sloping surface 243 causing the flexible lip 252 to flex outwardly; thereupon the lens is positioned in the groove 234 and the thickness of the lens will determine the flexed position of the flexible lip 235. While the flexible lip 235 has been described in conjunction with the modification shown in FIGS. 5 and 6, it is to be undertsood that a similar construction could be used with the other modifications when it is desired to provide for a plurality of lenses having various thicknesses.

The undersurface of the ring 232 has an annular groove 246 of substantially rectangular cross section and forming a space between the inner flexible lip 252 and an outer flexible lip 256. The wall defining the outer surface of the groove 246 has a generally rectangular annular groove 264 defined by horizontal upper and lower surfaces 266 and 268 joined by a vertical surface 270. The outer flexible lip 256 is defined on its inner side by a sloping surface 272 which slopes outwardly from the edge of lower horizontal surface 268 to the vertical surface defining the outer wall of the ring 232.

In assembling the unitary lens 262 and ring 232 on the instrument case 210, a downward force on the ring 232 causes the flexible lip 256 to flex outwardly against the annular flange 227 permitting the flange 227 to be snapped into the annular groove 264. In this construction, the case and ring are assembled in a manner similar to the assembly used for the lenses 62 and 162 of the modifications in FIGS. 1 and 3.

Inasmuch as various other modifications, changes and reversal of parts will be apparent to those skilled in the art, it is intended that the foregoing description of the drawing be interpreted as illustrative and not in a limiting sense.

What is claimed is:

1. In an instrument housing, the combination comprising a case, means defining an opening in said case, a sealing ring having inner and outer flexible lips on opposite sides of a recessed undersurface, said sealing ring having a groove adjacent said inner flexible lip, a transparent element adapted to be forced against said inner flexible lip and flexing the same whereby the transparent element is sealingly mounted in said groove, and interengaging surfaces between said means and said outer flexible lip forming a sealed closure between said case and said ring.

2. The combination as recited in claim 1 wherein said inner and outer flexible lips are of the same length.

3. The combination as recited in claim 1 wherein said outer flexible lip has a greater length than said inner flexible lip.

4. The combination as recited in claim 1 wherein said interengaging surfaces comprises a peripheral flange on said case and groove means on said outer flexible lip for receiving said flange.

5. The combination as recited in claim 1 wherein said groove has a sloping surface on its upper wall portion forming a resilient lip whereby said groove may accommodate different sizes of transparent elements.

6. In an instrument case and transparent closure therefor the combination comprising a generally hollow casing, means defining an opening at one end of said casing, a sealing element having a central aperture and a periphery substantially conforming to said opening, an undersurface of said sealing element having a peripheral recess, an inner flexible lip on one side of said recess and an outer flexible lip on another side of said recess, said sealing element having a groove adjacent said inner flexible lip, a transparent element sealingly mounted in said groove to close said central aperture, a plurality of surfaces on said means, and a plurality of surfaces on said outer flexible lip engaging said plurality of surfaces on said means to form a removably sealed closure between said sealing element on said casing.

7. The combination as recited in claim 6 wherein said inner and outer flexible lips are of the same length, said plurality of surfaces on said means comprises a first sloping surface of decreasing diameter and a second sloping surface of increasing diameter, and said plurality of surfaces on said outer flexible lip comprises a pair of sloping surfaces mating said first and second sloping surfaces.

8. The combination as recited in claim 6 wherein said outer flexible lip has a greater length than said inner flexible lip.

References Cited by the Examiner

UNITED STATES PATENTS

| | | | |
|---|---|---|---|
| Re. 18,669 | 11/32 | Duffy et al. | 215—41 |
| 1,093,211 | 4/14 | Schulhoff | 215—41 |
| 2,346,495 | 4/44 | Lingel | 73—431 X |
| 2,426,800 | 9/47 | Triplett | 73—431 X |
| 3,074,579 | 1/63 | Miller | 215—41 |

RICHARD C. QUEISSER, *Primary Examiner.*

ROBERT EVANS, *Examiner.*